(12) United States Patent
Thakolsri et al.

(10) Patent No.: US 11,576,232 B2
(45) Date of Patent: Feb. 7, 2023

(54) METHOD FOR ESTABLISHING A CONNECTION OF A MOBILE TERMINAL TO A MOBILE RADIO COMMUNICATION NETWORK AND COMMUNICATION NETWORK DEVICE

(71) Applicant: NTT DOCOMO, INC., Tokyo (JP)

(72) Inventors: Srisakul Thakolsri, Munich (DE);
Malla Reddy Sama, Munich (DE);
Irfan Ali, Palo Alto, CA (US); Atsushi Minokuchi, Tokyo (JP); Takuya Shimojo, Tokyo (JP); Alf Zugenmaier, Munich (DE)

(73) Assignee: NTT DOCOMO, INC., Tokyo (JP)

( * ) Notice: Subject to any disclaimer, the term of this patent is extended or adjusted under 35 U.S.C. 154(b) by 653 days.

(21) Appl. No.: 16/340,603

(22) PCT Filed: Sep. 27, 2017

(86) PCT No.: PCT/EP2017/074458
§ 371 (c)(1),
(2) Date: Apr. 9, 2019

(87) PCT Pub. No.: WO2018/069043
PCT Pub. Date: Apr. 19, 2018

(65) Prior Publication Data
US 2020/0053564 A1    Feb. 13, 2020

(30) Foreign Application Priority Data

Oct. 10, 2016   (EP) ..................................... 16193086

(51) Int. Cl.
*H04W 12/037*   (2021.01)
*H04W 92/10*    (2009.01)
(Continued)

(52) U.S. Cl.
CPC ......... *H04W 92/10* (2013.01); *H04W 12/037* (2021.01); *H04W 12/062* (2021.01); *H04W 12/069* (2021.01); *H04W 12/122* (2021.01)

(58) Field of Classification Search
CPC ......................... H04W 12/062; H04W 12/069; H04W 12/037
See application file for complete search history.

(56) References Cited

U.S. PATENT DOCUMENTS 8,543,089 B2 *   9/2013  Chun .................. H04W 12/033
                                                            455/410
9,872,209 B1 *   1/2018  Saleh ................ H04W 36/0066
(Continued)

FOREIGN PATENT DOCUMENTS

CN      103858517 A      6/2014
WO      2015172088 A1   11/2015
(Continued)

OTHER PUBLICATIONS

Decision of Refusal issued in counterpart Japanese Patent Application No. 2017-555634, mailed Apr. 9, 2019 (6 Pages).
(Continued)

*Primary Examiner* — William S Powers
(74) *Attorney, Agent, or Firm* — Osha Bergman Watanabe & Burton LLP

(57) ABSTRACT

According to one embodiment, a method for establishing a connection of a mobile terminal to a mobile radio communication network is described comprising a first common control plane function of a mobile radio communication network receiving a connection request from a mobile terminal; the first common control plane function authenticating the mobile terminal including generating an authentication context of the mobile terminal; the first common control plane function forwarding the connection request and transmitting the authentication context of the mobile terminal to a second common control plane function of the
(Continued)

mobile radio communication network and the second common control plane function connecting the mobile terminal to the mobile radio communication network.

11 Claims, 13 Drawing Sheets

(51) Int. Cl.
*H04W 12/062* (2021.01)
*H04W 12/069* (2021.01)
*H04W 12/122* (2021.01)

(56) References Cited

U.S. PATENT DOCUMENTS

| | | | |
|---|---|---|---|
| 2014/0161007 A1* | 6/2014 | Donthi | H04W 76/28 370/311 |
| 2014/0211728 A1 | 7/2014 | Zembutsu et al. | |
| 2016/0066231 A1 | 3/2016 | Zembutsu et al. | |
| 2016/0119913 A1* | 4/2016 | Shaw | H04W 8/06 370/329 |
| 2016/0128051 A1 | 5/2016 | Zembutsu et al. | |
| 2017/0250789 A1 | 8/2017 | Zembutsu et al. | |
| 2017/0251103 A1 | 8/2017 | Zembutsu et al. | |
| 2018/0063763 A1* | 3/2018 | Gupta | H04W 16/08 |

FOREIGN PATENT DOCUMENTS

| | | | |
|---|---|---|---|
| WO | 2015/182111 A1 | 12/2015 | |
| WO | WO-2015182111 A1 * | 12/2015 | ............ H04W 12/06 |
| WO | 2016129238 A1 | 8/2016 | |

OTHER PUBLICATIONS

Office Action issued in the counterpart Japanese Patent Application No. 2017-555634, dated Aug. 6, 2019 (9 pages).
Office Action issued in the counterpart Chinese Patent Application No. 201780061882.4, dated Mar. 26, 2021 (15 pages).
Office Action issued in the counterpart Japanese Patent Application No. 2017-555634, dated Feb. 25, 2020 (12 pages).
Written Opinion issued for PCT/EP2017/074458, dated Dec. 15, 2017 (6 pages).
Office Action issued in the counterpart Japanese Patent Application No. 2017555634, dated Jan. 8, 2019 (6 pages).
Extended European Search Report issued for EP 16193086.2, dated Apr. 18, 2017 (8 pages).
Office Action in counterpart Chinese Patent Application No. 201780061882.4 dated Nov. 2, 2021 (13 pages).
Office Action issued in Chinese Application No. 201780061882.4; dated Jun. 2, 2022 (12 pages).
Office Action issued in the counterpart Chinese Patent Application No. 201780061882.4, dated Feb. 23, 2022 (13 pages).

* cited by examiner

METHOD FOR ESTABLISHING A CONNECTION OF A MOBILE TERMINAL TO A MOBILE RADIO COMMUNICATION NETWORK AND COMMUNICATION NETWORK DEVICE

TECHNICAL FIELD

The present disclosure relates to methods for establishing a connection of a mobile terminal to a mobile radio communication network and communication network devices.

BACKGROUND ART

In a mobile communication network, it typically occurs that UE (user equipment) authentication is performed after a reroute of an attach request of the UE from one common CP (control plane) function (e.g. MIME, mobility management entity) to another common CP function which is in charge of the UE, e.g. based on the UE's subscription (e.g. based on a UE Type, dedicated Core Network ID, enterprise ID, client ID, tenant-ID, customer-ID). This opens the network to an attack, i.e. a Denial of Service attack to the default common CP function (e.g. default MIME), the common CP function being in charge of the UE, and also the HSS (Home Subscriber Server).

SUMMARY OF INVENTION

Technical Problem

Accordingly, approaches that impede such attacks are desirable.

Solution to Problem

According to one embodiment, a method for establishing a connection of a mobile terminal to a mobile radio communication network is provided comprising a first common control plane function of a mobile radio communication network receiving a connection request from a mobile terminal; the first common control plane function authenticating the mobile terminal including generating an authentication context of the mobile terminal; the first common control plane function forwarding the connection request and transmitting the authentication context of the mobile terminal to a second common control plane function of the mobile radio communication network and the second common control plane function connecting the mobile terminal to the mobile radio communication network.

According to a further embodiment, a communication network device according to the above method is provided.

BRIEF DESCRIPTION OF DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DESCRIPTION OF EMBODIMENTS

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to forth new aspects.

Figure 1:
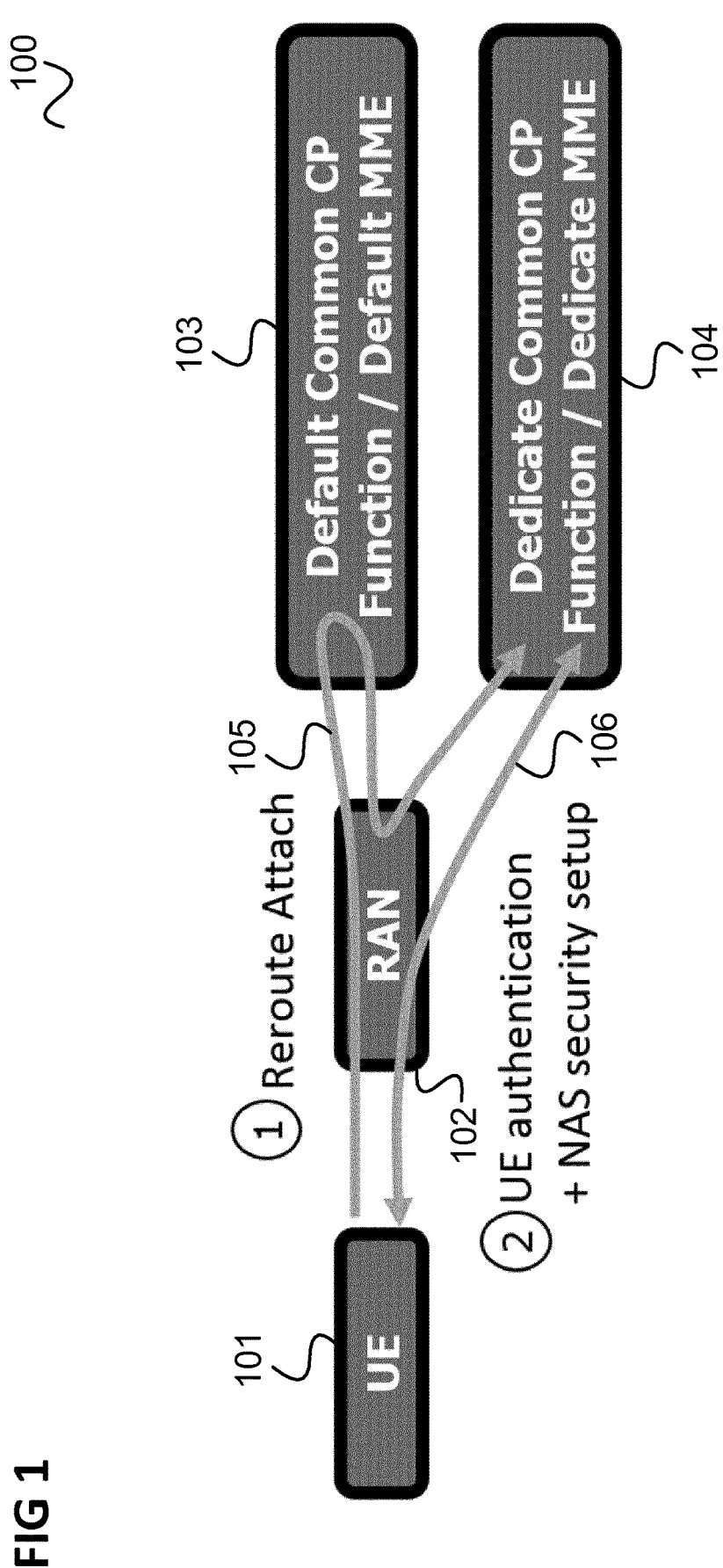
FIG. 1 illustrates the rerouting of an attach request of a UE (user equipment).

FIG. 1 illustrates the rerouting of an attach request of a UE (user equipment).

It is assumed that a UE 101 sends an attach request to a mobile communication network, specifically to the mobile communication network's radio access network (RAN) 102. The RAN 102 forwards the attach request to a default common CP function (C-CPF, e.g. a default MME) 103 which may however not be responsible for the UE 101, e.g. because of the UE's type, or dedicated Core Network ID, or enterprise ID, or client ID, or tenant-ID, or customer-ID.

Examples of UE type are, "Machine Type Communication (MTC) UE Type", "Smartphone UE type", etc. The UE type is typically stored as a part of UE's subscription.

Therefore, the default common CP function 103 reroutes the attach request to a dedicated common CP function (e.g. dedicated MME) 104 (as illustrated by a first arrow 105) which performs the UE authentication and NAS (Non Access Stratum) security setup (as illustrated by a second arrow 106).

Figure 2:
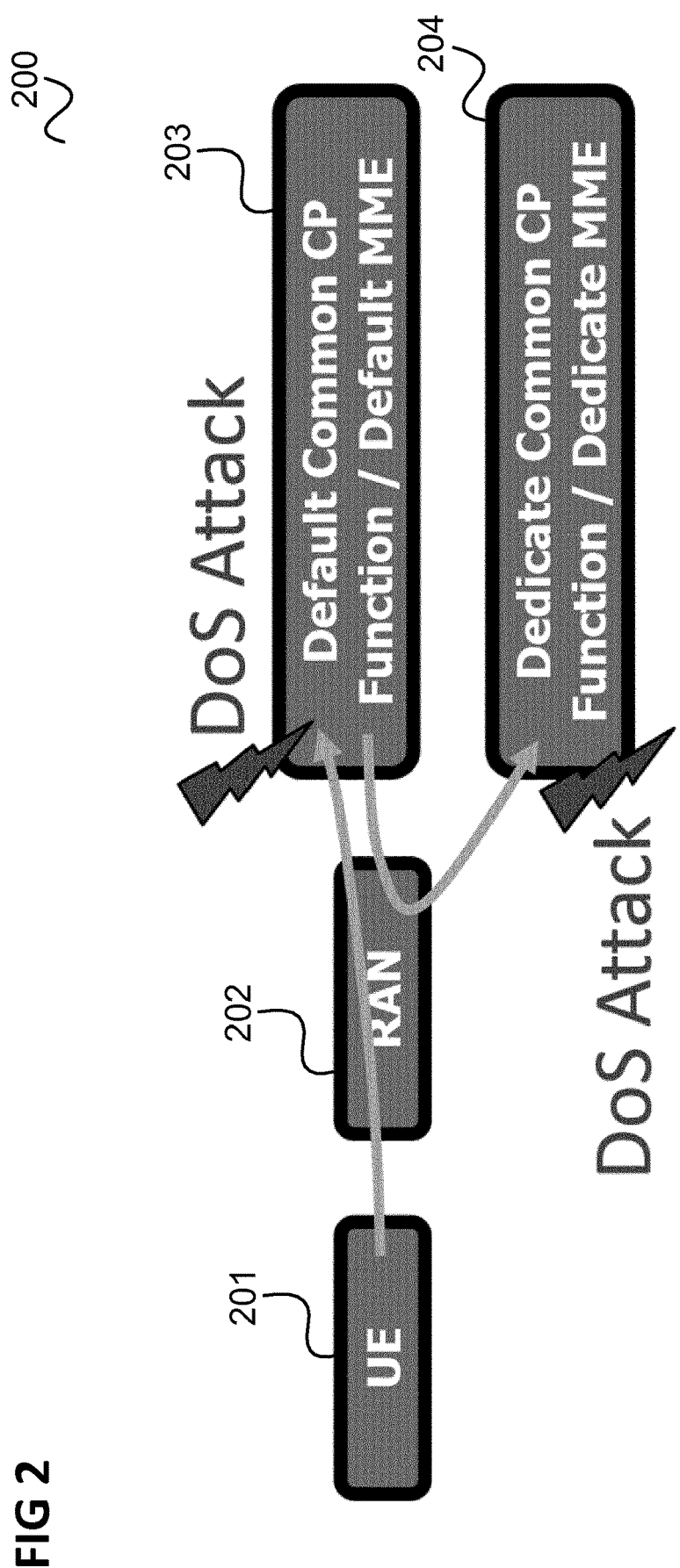
FIG. 2 illustrates a Denial of Service (DoS) Attack by a UE via a RAN on a common CP function in the scenario of FIG. 1.

FIG. 2 illustrates a Denial of Service (DoS) Attack by a UE 201 via RAN 202 on the default common CP function 203 which spreads via the rerouting to the dedicated common CP function 204 in the scenario of FIG. 1.

A DoS attack is an attempt to make a machine or network resource unavailable to its intended users, such as to temporarily or indefinitely interrupt or suspend services of a host connected to the Internet. A Denial of Service is typically accomplished by flooding the targeted machine or resource with superfluous requests in an attempt to overload systems and prevent some or all legitimate requests from being fulfilled.

In the following, the scenario of FIG. 1 is described in more detail for an LIE (Long Term Evolution) communication system with reference to FIGS. 3 and 4.

Figure 3:
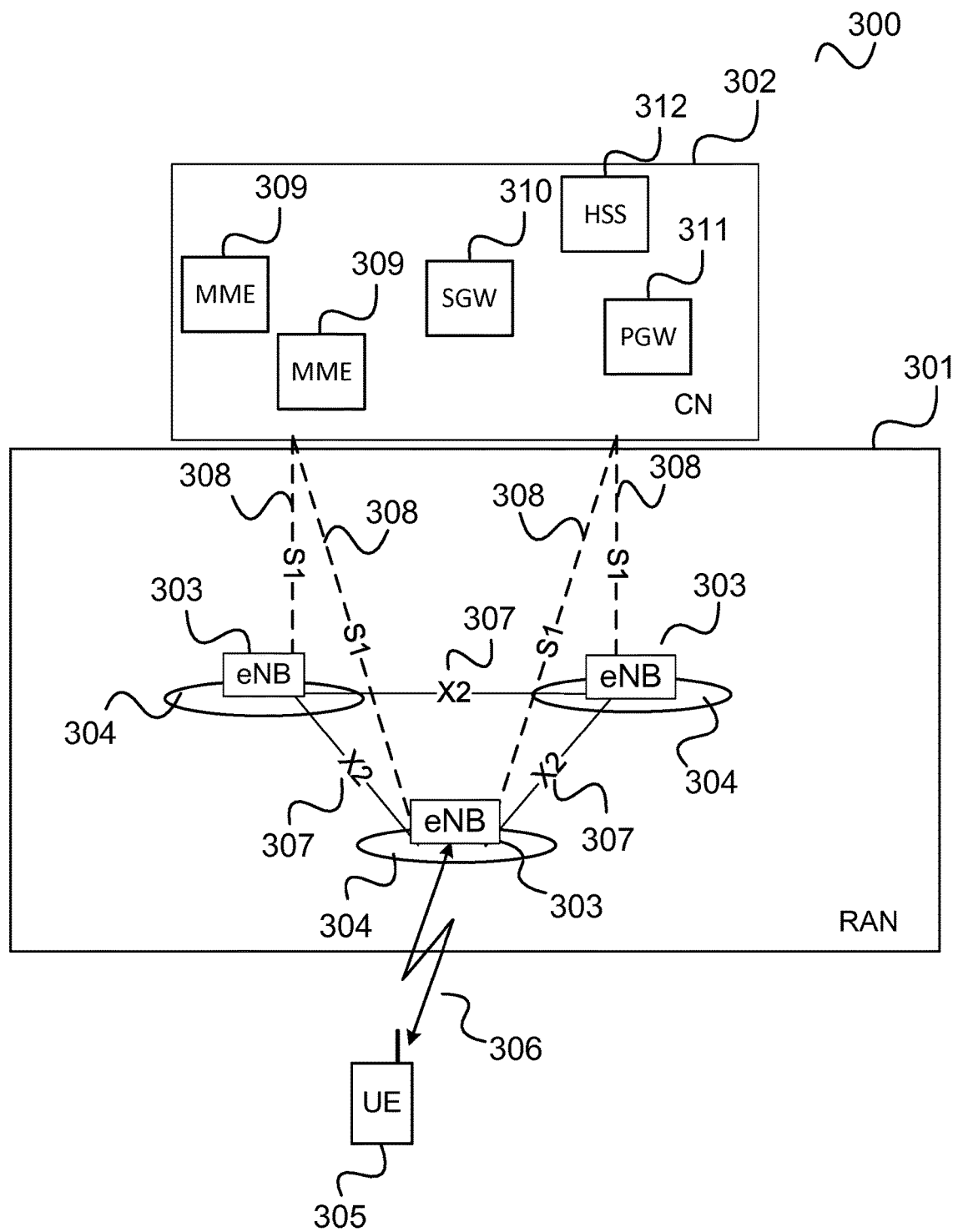
FIG. 3 shows an LTE (Long Term Evolution) communication system.

FIG. 3 shows an LTE (Long Term Evolution) communication system.

The communication system 300 includes a radio access network 301 (RAN, i.e. an E-UTRAN, Evolved UMTS (Universal Mobile Communications System) Terrestrial Radio Access Network according to LTE). The radio access network 301 may include base (transceiver) stations (i.e. eNodeBs, eNBs, according to LTE) 303. Each base station 303 provides radio coverage for one or more mobile radio cells 304 of the radio access network 301.

A mobile terminal (also referred to as UE, user equipment, or MS, mobile station) 305 located in one of the mobile radio cells 304 (in this example the middle radio cell 304) may communicate with the core network 302 and with other mobile terminals 305 via the base station providing coverage in (in other words operating) the mobile radio cell.

Control and user data are transmitted between a base station 303 and a mobile terminal 305 located in the mobile radio cell 304 operated by the base station 303 over the air interface 306 on the basis of a multiple access method.

The base stations 303 are interconnected with each other by means of a first interface 307, e.g., an X2 interface. The base stations 303 are also connected by means of a second interface 308, e.g. an S1 interface, to the core network, e.g. including MMEs (Mobility Management Entity) 309, a Serving Gateway (SGW) 310, a Packet Data Gateway (PGW) 311 and a Home Subscriber Server (HSS) 312. For example, the MMEs 309 are responsible for controlling the mobility of mobile terminals located in the coverage area of E-UTRAN, while the S-GW 310 is responsible for handling the transmission of user data between mobile terminals 305 and core network 302.

Figure 4:
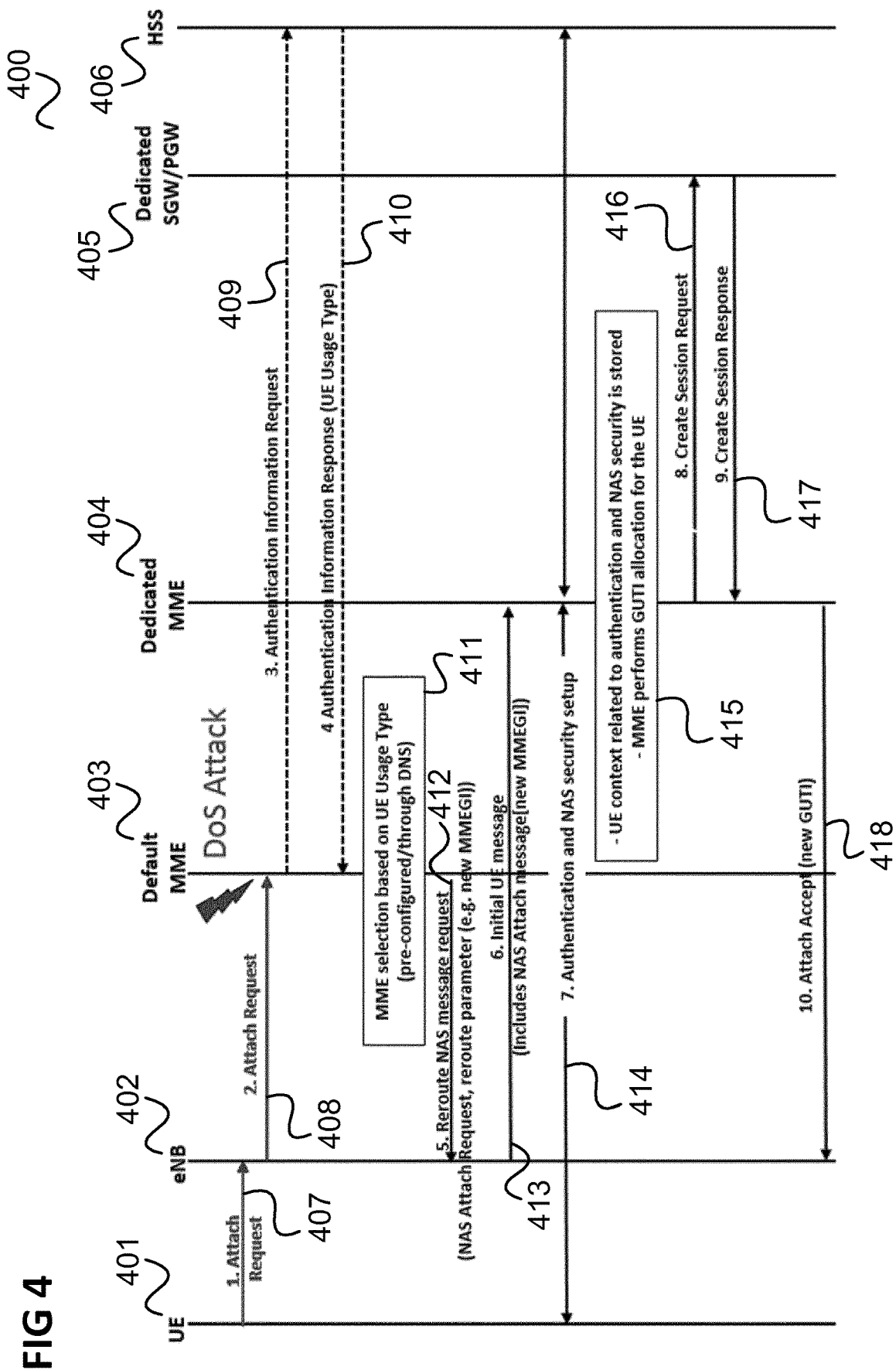
FIG. 4 shows a message flow diagram illustrating an attach procedure in the communication system of FIG. 3.

FIG. 4 shows a message flow diagram 400 illustrating an attach procedure in the communication system of FIG. 3.

The message flow takes place between a UE 401 corresponding to the UE 305, an eNB 402 corresponding to the eNB 303 serving UE 305, a default MME 403 and a dedicated MME 404 (of core network 302), a dedicated SGW or Packet Data Gateway PGW 405 (of core network 302) and an HSS 406 corresponding to HSS 312.

In 407, the UE 401 sends an attach request to the eNB 402.

In 408, the eNB 402 forwards the attach request to the default MME 403.

In 409, the default MME 403 sends an authentication information request to the HSS 406. However, no actual authentication is performed, the authentication information request only serves to get the UE's subscription profile from the HSS 406. This profile includes but not limited to, for example, UE usage type (i.e. the UE type as described above) or dedicated Core Network ID, enterprise ID, client ID, tenant-ID, customer-ID.

In 410, the HSS sends an authentication information response (including the UE usage type) to the default MME 403.

In 411, the default MME 403 performs an MME selection based on the UE usage type (pre-configured or through a domain name server) and sends, in 412, a reroute NAS message request to the eNB 402 which may include a NAS attach request and a reroute parameter (e.g. an MIME group identifier MMEGI identifying the rerouting target).

In 413, the eNB 402 sends the initial UE attach request message to the dedicated MME 404 (assumed to be the target of the rerouting) which may include the NAS attach message and the MMEGI.

In 414, the dedicated MME 404 performs both authentication and NAS security setup with the UE (involving the HSS 406). The NAS security setup includes the negotiation of a key (other than the authentication key) to be used for secure communication between the dedicated MME and the UE.

In 415, the dedicated MIME 404 stores UE context related to the authentication and the NAS security setup and performs GUTI (globally unique temporary identifier) allocation for the UE 401.

In 416, the dedicated MME 404 sends a create session request to the SGW/PGW 405 which is answered in 417.

In 418, the dedicated MME 404 sends an attach accept message (including the GUTI) to the eNB 402 and further parts of the attach procedure may then follow but are not described here.

As can be seen, since authentication is performed by the dedicated MME 404, a DoS Attack to the default MME 403 spreads to the dedicated MME 404.

In the following, the scenario of FIG. 1 is described in more detail for a 5G (fifth generation) communication system with reference to FIGS. 5 and 6.

Figure 5:
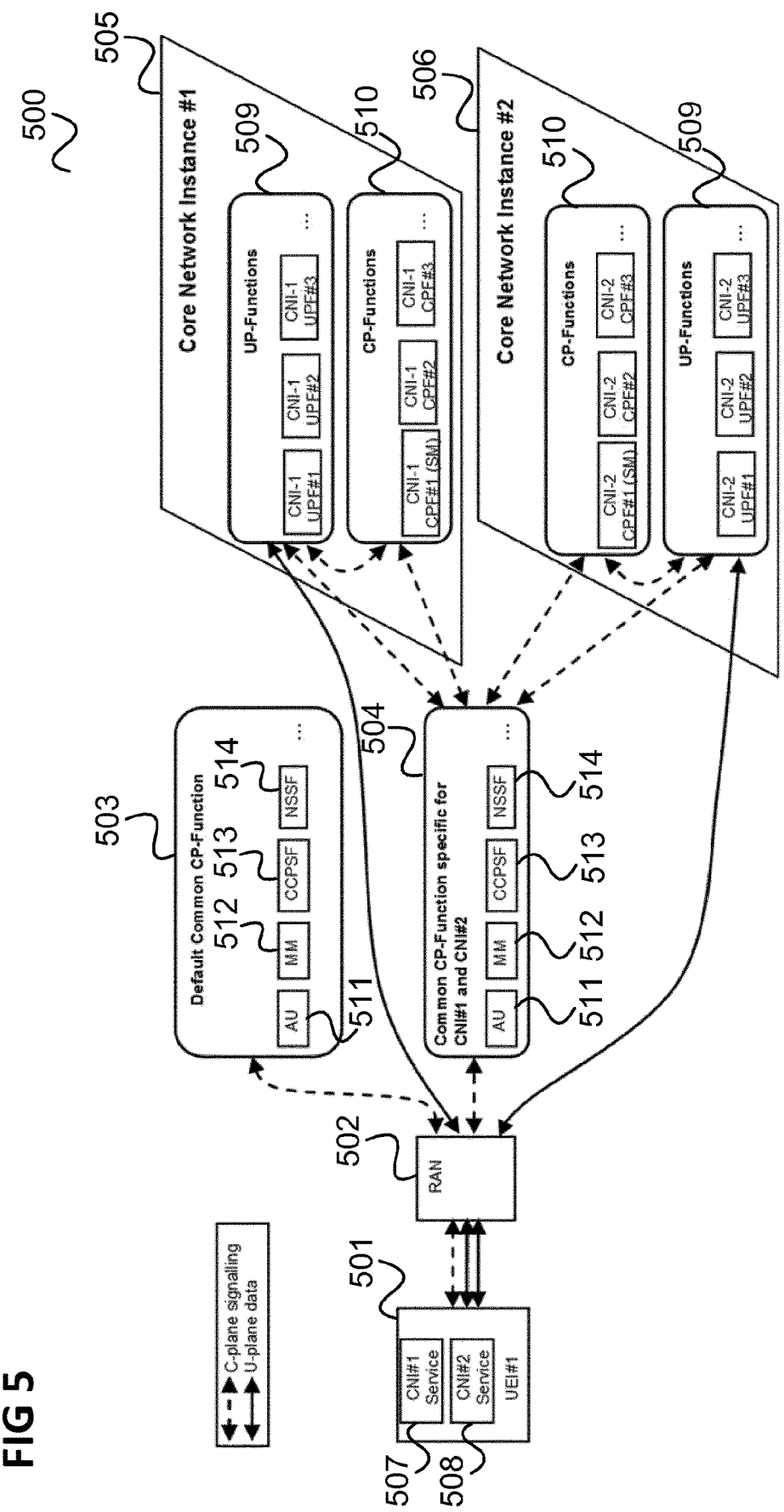
FIG. 5 shows a 5G communication system.

FIG. 5 shows a 5G communication system 500.

The communication system 500 includes a UE 501 which may communicate with a 5G RAN 502 which is connected to a default common CP function 503 and a common CP function 504 specific for a first core network instance (CNI, also referred to as network slice or network slice instance) 505 and a second core network instance (CNI) 506.

The first core network instance 505 for example provides a first service 507 and the second core network instance 506 for example provides a second service 508 used by the UE 501.

The core network instances 506, 507 comprise user plane functions 509 and control plane functions 510.

The common CP functions comprise authentication functionality 511, mobility management functionality 512, a common CP selection function (CCPSF) 513 and a network slice selection function 514.

It should be noted that alternatively, the 5G communication system may not comprise dedicated CP functions 510 in each CM, but only comprise of dedicated UP functions 509 (i.e. the CP functions 510 may not be present in an alternative embodiment.

Figure 6:
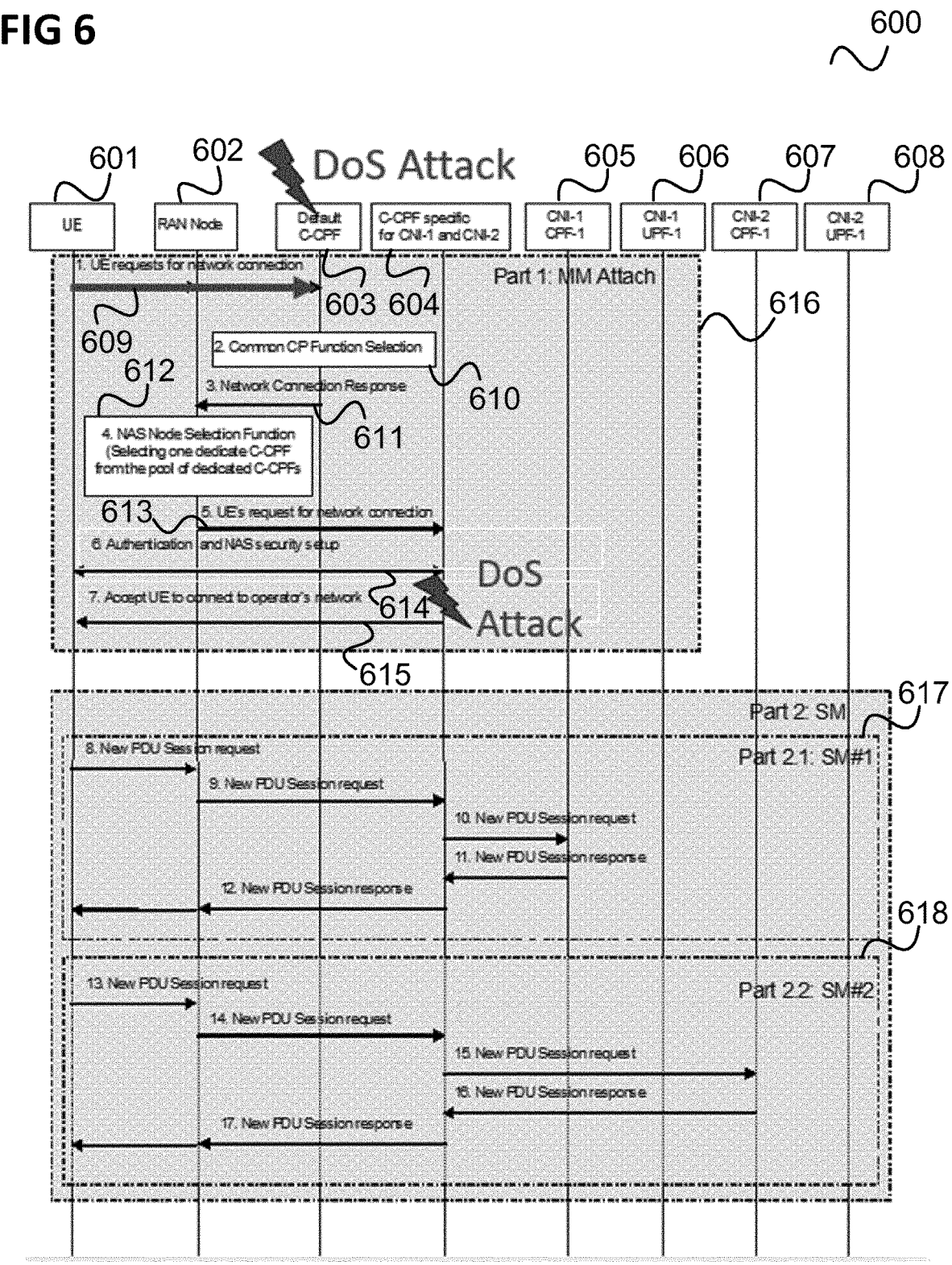
FIG. 6 shows a message flow diagram illustrating an attach procedure (followed by session management procedures) in the communication system of FIG. 5.

FIG. 6 shows a message flow diagram 600 illustrating an attach procedure (followed by session management procedures) in the communication system of FIG. 6.

The message flow takes place between a UE 601 corresponding to UE 501, a RAN node 602 of RAN 502, a default common CP function 603 corresponding to default common CP function (C-CPF) 503, a common CP function 604 specific for the core network instances 505 and 506 (i.e. a dedicated C-CPF), first CM CP functions 605 and first CM UF functions 606 of the first CM 505 and second CM CP functions 607 and second CM UF functions 608 of the second CM 506.

In 609, the UE 601 sends a request for a network connection to the default C-CPF 603 via the RAN node 602.

In 610, the default C-CPF 603 performs a C-CPF selection.

In 611, the default C-CPF 603 sends a network connection response to the RAN node 602.

In 612, in the RAN node 602, a NAS node selection function selects one dedicated C-CPF from the pool of dedicated C-CPFs.

In 613, the RAN node 602 sends the UE's request for network connection to the (selected) dedicated C-CPF 604.

In 614, the dedicated C-CPF 604 performs both authentication to authorize the UE to connect the operator's network and NAS security setup for secure communication with the mobile terminal.

In 615, the dedicated C-CPF 604 notifies the UE 601 that it has been accepted that the UE 601 connects to the operator's network.

This ends the attach procedure 616 which may be followed by session management procedures 617, 618 which include the exchange of PDU session requests and corresponding responses between the UE 601 and the responsible CNI control functions 605, 607.

Again, as can be seen, since authentication is performed by the dedicated C-CPF 604, a DoS Attack to the default C-CPF 603 spreads to the dedicated C-CPF 604.

Figure 7:
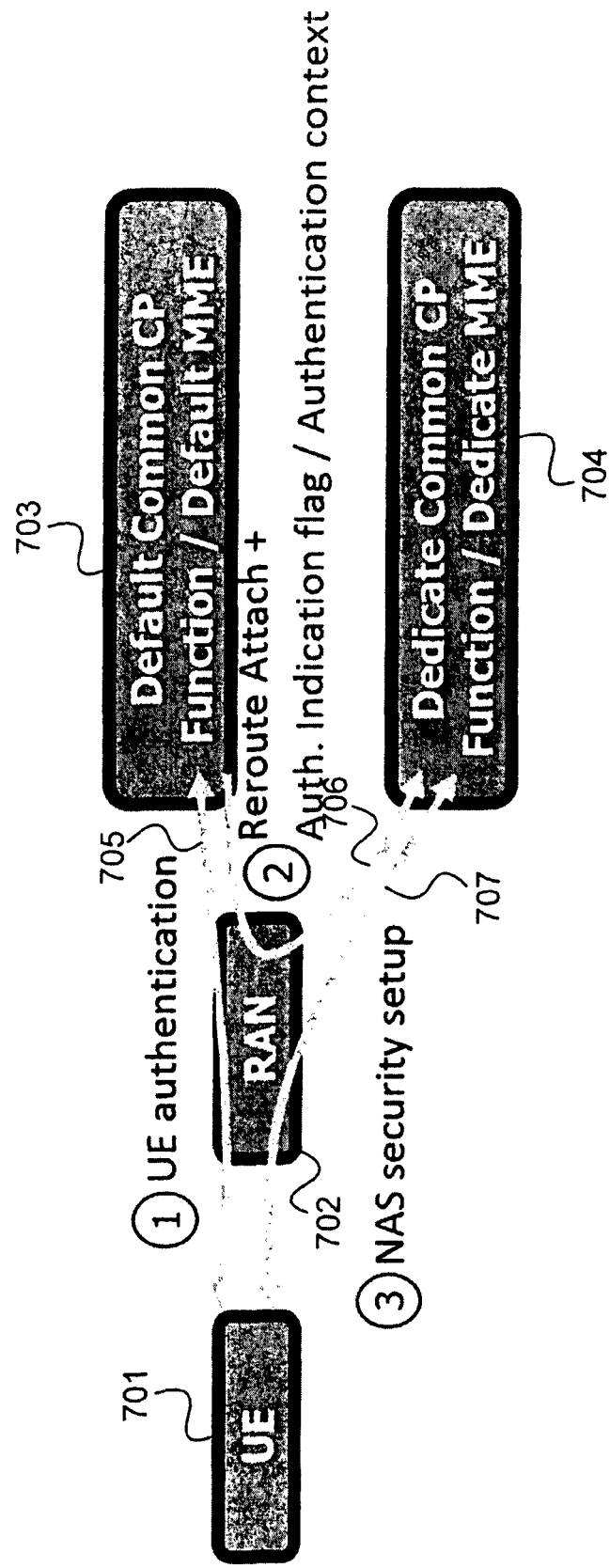
FIG. 7 illustrates an approach which includes performing authentication before rerouting the Attach request to the dedicated common CP function.

FIG. 7 illustrates an approach which includes performing authentication before rerouting the Attach request to the dedicated common CP function.

As in FIG. 1, it is assumed that a UE 701 sends an attach request to a mobile communication network specifically to the mobile communication network's radio access network (RAN) 702. The RAN 702 forwards the attach request to a default common CP function 703 which is not responsible for the UE 701, e.g. because of the UE's type, and/or dedicated and/or Core Network ID, and/or enterprise ID, and/or client ID, and/or tenant-ID, and/or customer-ID.

However, the default common CP 703 performs an authentication (as illustrated by a first arrow 705) and only after the authentication reroutes the attach request to the dedicated common CP function 704 (as illustrated by a second arrow 706) which performs the UE authentication and NAS (Non Access Stratum) security setup (as illustrated by a third arrow 707).

Figure 8:
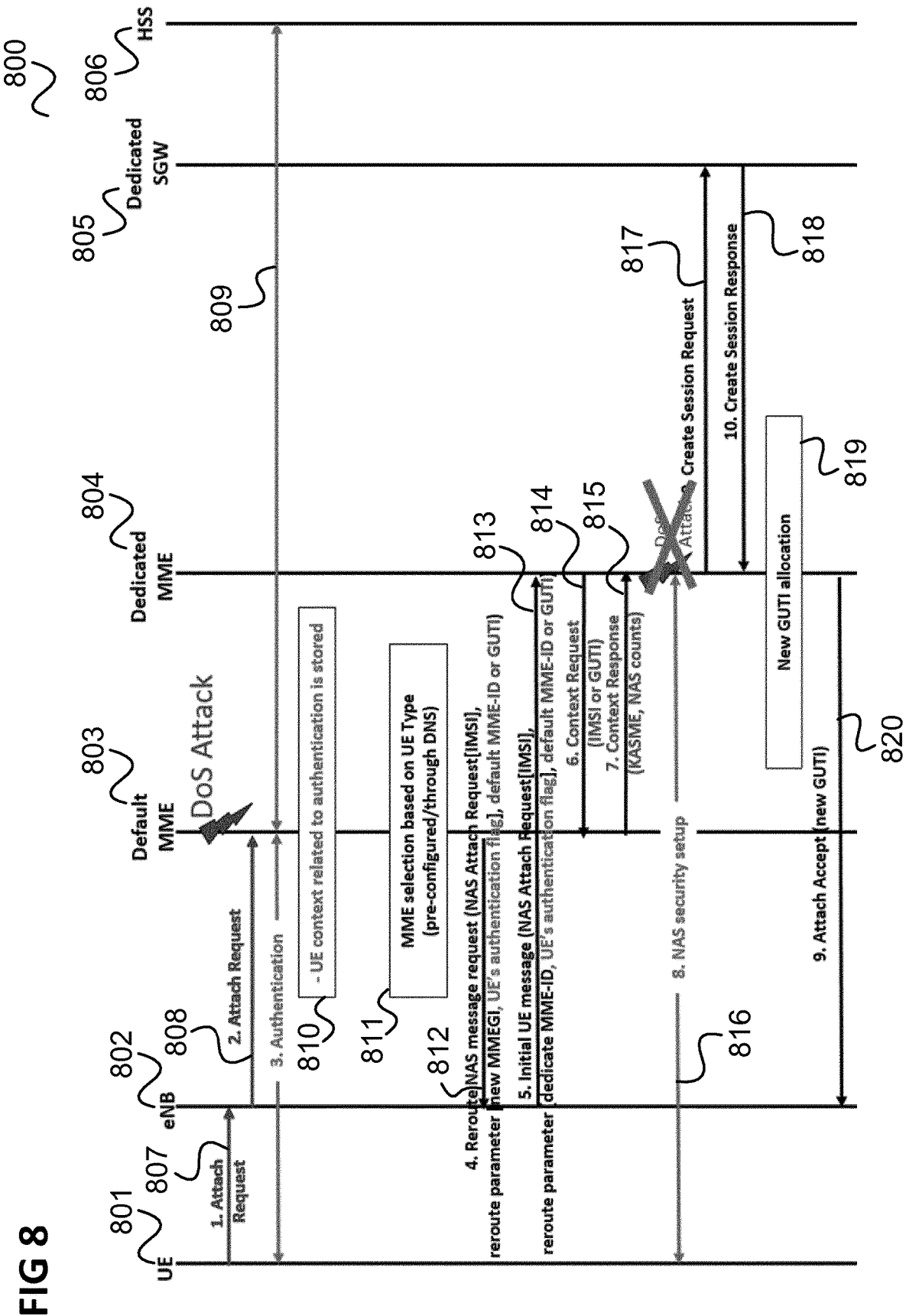
FIG. 8 shows a message flow diagram illustrating an application of the approach of FIG. 7 in the scenario of FIG. 4.

Furthermore, the rerouting includes the signalling of an authentication indication indicating to the dedicated common CP 704 that the UE's authentication has been performed. Such authentication indication can be done either using an explicit flag of UE's authentication already performed or using the UE's authentication context to the dedicated common CP 704, FIG. 8 shows a message flow diagram 800 illustrating an application of the approach of FIG. 7 in the scenario of FIG. 4.

Similarly to FIG. 4, the message flow takes place between a UE 801, an eNB 802, a default MME 803, a dedicated MME, a dedicated SGW 805 and an HSS 806.

In 807, the UE 801 sends an attach request to the eNB 802.

In 808, the eNB 802 forwards the attach request to the default MME 803.

In 809, the default MIME 803 performs authentication of the UE 801 (exchanging messages with the UE 801 and the HSS 806) and also gets the UE's subscription profile (e.g., UE usage type, dedicated Core Network ID, enterprise ID, client ID, tenant-ID, customer-ID). The operation of 809 does not include the NAS security setup.

In 810, the default MME 803 stores the UE context related to the authentication (i.e. the authentication context of the UE 801). The default MME 803 may perform GUTI allocation for the UE 801 at this stage.

In 811, the default MIME 803 performs an MME selection based on the UE's subscription profile (e.g., UE usage type, dedicated Core Network ID, enterprise ID, client ID, tenant-ID, customer-ID). The default MIME 803 may be pre-configured or determines the dedicated MME through a domain name server. The default MME 803 sends, in 812, a reroute NAS message request to the eNB 802 which may include a NAS attach request, a reroute parameter (e.g. an MME group identifier MIMEGI identifying the rerouting target) and the authentication flag indicating that UE authentication has been performed to the eNB 802. This authentication flag allows the dedicated MME 804 (i.e. the target of the rerouting) to know that the dedicated MME does not have to perform UE authentication once again.

In addition, the GUTI (if available) or the default MME's ID (e.g., GUMMEI (Globally Unique MME Identity)) is also sent along with the message in 812. This GUTI or the default MME's ID is used to enable the rerouting target (i.e. the dedicated MME 804) to know about which MME that the rerouting target should fetch the UE's authentication context, which includes for example, the authentication key negotiated between the default MME 803 and the UE 801 during the authentication performed in 809.

In 813, the eNB 802 sends the initial UE attach request message to the dedicated MME 804 which may include the NAS attach message and the MMEGI authentication flag, and the GUTI (if available) or the default MME's ID (e.g., GUMMEI).

In 814, the dedicated MME 804 performs Context Request to the default MME to fetch the UE's authentication context. This context is sent in the Context Response message in 815.

In 816, the dedicated MME 804 performs NAS security setup with the UE 801. In contrast to the procedure of FIG. 4, the dedicated MIME 804 does not perform an authentication of the UE 801 at this stage.

In 817, the dedicated MIME 804 sends a create session request to the SGW/PGW 805 which is answered in 818.

In 819, the dedicated MME performs GUTI allocation for the UE 801.

In 820, the dedicated MME 804 sends an attach accept message (including the GUTI) to the eNB 802 and further parts of the attach procedure may then follow but are not described here.

Figure 9:
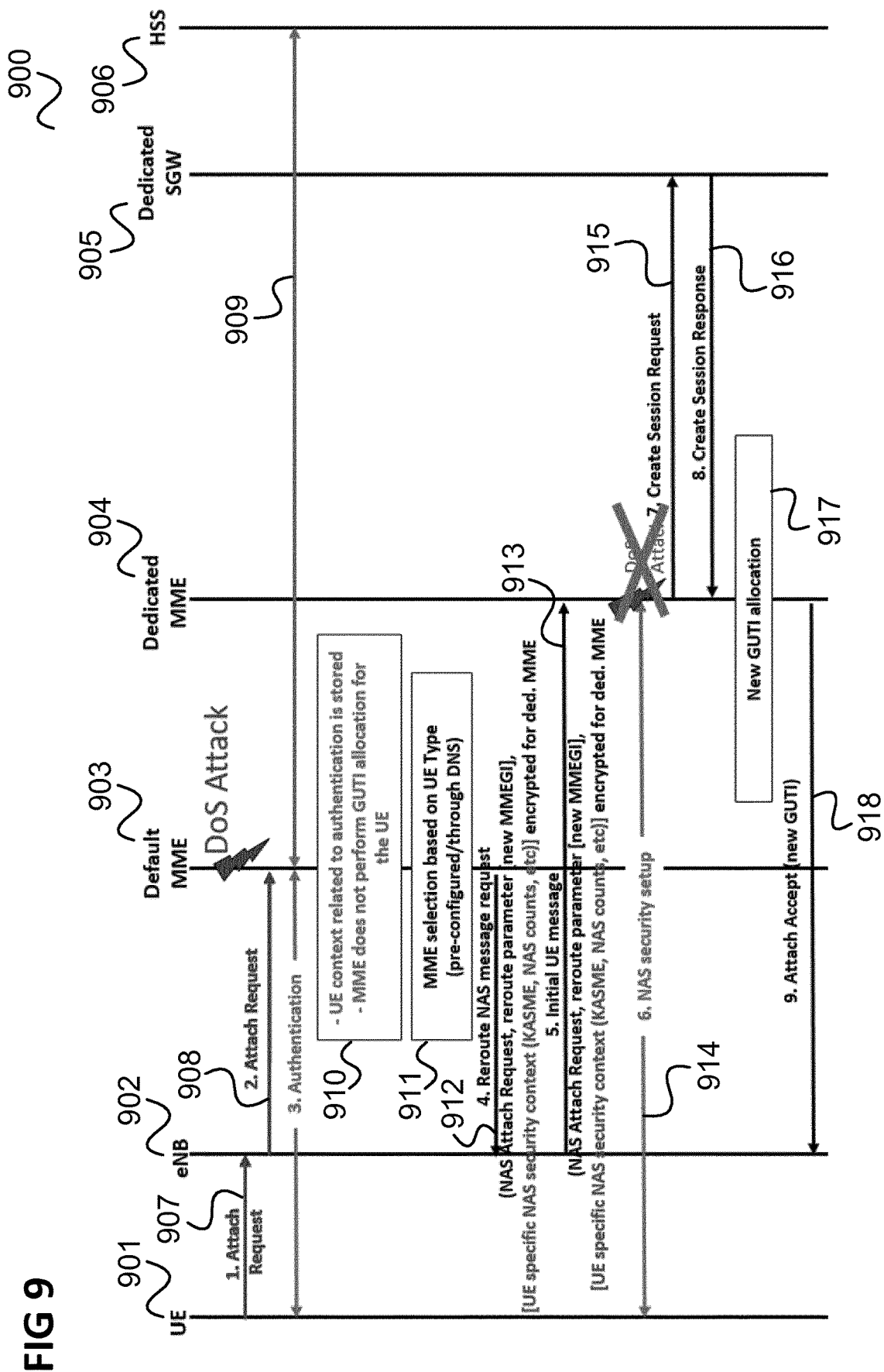
FIG. 9 shows another alternative message flow diagram illustrating an application of the approach of FIG. 7 in the scenario of FIG. 4.

FIG. 9 shows another alternative message flow diagram 900 illustrating an application of the approach of FIG. 7 in the scenario of FIG. 4. In this alternative, the main difference to the FIG. 9 is that the default MME sends the UE authentication context in the reroute NAS message request to the eNB 802, and not the authentication flag. With this, the dedicate MME does not need to fetch the UE authentication flag from the default MME as performed in the flow in FIG. 8.

Similarly to FIG. 4, the message flow takes place between a UE 901, an eNB 902, a default MIME 903, a dedicated MME, a dedicated SGW 905 and an HSS 906.

In 907, the UE 901 sends an attach request to the eNB 902.

In 908, the eNB 902 forwards the attach request to the default MME 903.

In 909, the default MME 903 performs authentication of the UE 901 (exchanging messages with the UE 901 and the HSS 906) and also gets the UE's subscription profile (e.g., UE usage type, dedicated Core Network ID, enterprise ID, client ID, tenant-ID, customer-ID). This does not include the NAS security setup.

In 910, the default MME 903 stores the UE context related to the authentication (i.e. the authentication context of the UE 901). The default MME 903 does not perform GUTI allocation for the UE 901 at this stage.

In 911, the default MME 903 performs an MIME selection based on the UE's subscription profile (e.g., UE usage type, dedicated Core Network ID, enterprise ID, client ID, tenant-ID, customer-ID). The default MME 903 may be pre-configured or determine the dedicate MME through a domain name server. The default MME 903 sends, in 912, a reroute NAS message request to the eNB 902 which may include a NAS attach request, a reroute parameter (e.g. an MME group identifier MIMEGI identifying the rerouting target) and the authentication context of the UE to the eNB 902 (e.g. an UE's specific NAS security context including the KASME key, the NAS counts etc.). The authentication context may for example include an authentication key negotiated between the default MME 903 and the UE 901 during the authentication. It may in particular include an authentication flag which allows the dedicated MME 904 (i.e. the target of the rerouting) to know that it does not have to perform UE authentication once again.

In 913, the eNB 902 sends the initial UE attach request message to the dedicated MIME 904 which may include the NAS attach message and the MMEGI and includes the UE's authentication context.

In 914, the dedicated MME 904 performs NAS security setup with the UE 901. In contrast to the procedure of FIG. 4, the dedicated MME 904 does not perform an authentication of the UE 901 at this stage.

In 915, the dedicated MIME 904 sends a create session request to the SGW/PGW 905 which is answered in 916.

In 917, the dedicated MME performs GUTI allocation for the UE 901.

In 918, the dedicated MME 904 sends an attach accept message (including the GUTI) to the eNB 902 and further parts of the attach procedure may then follow but are not described here.

Figure 10:
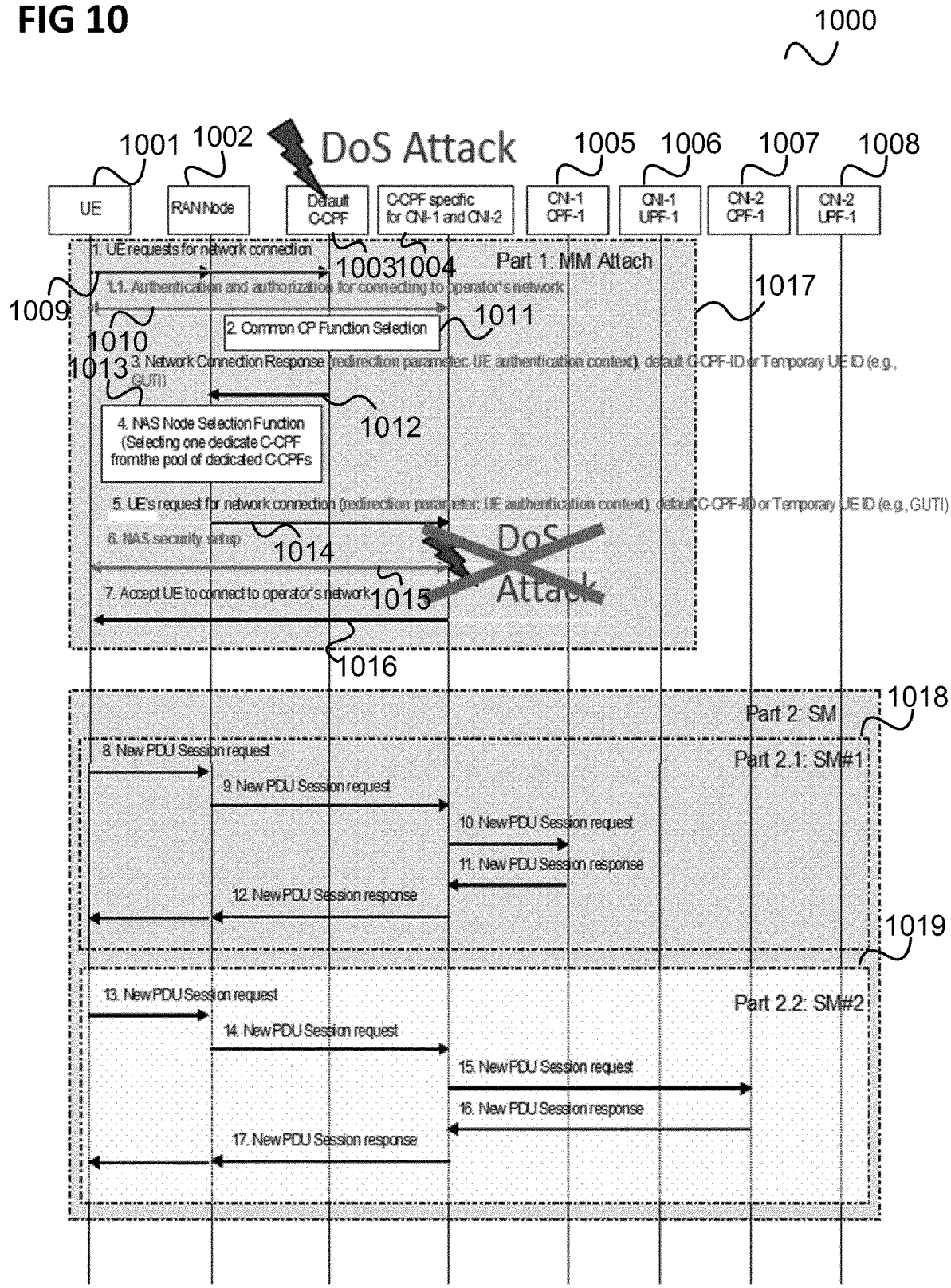
FIG. 10 shows a message flow diagram illustrating an application of the approach of FIG. 7 in the scenario of FIG. 6.

FIG. 10 shows a message flow diagram 1000 illustrating an application of the approach of FIG. 7 in the scenario of FIG. 6.

Similarly to FIG. 6, the message flow takes place between a UE 1001 and a RAN node 1002, a default C-CPF 1003, a dedicated C-CPF 1004, first CNI CP functions 1005 and first CNI UF functions 1006 of the first CNI 505 and second CM CP functions 1007 and second CM UF functions 1008 of the second CNI 506 of a mobile communication network (of a certain operator).

In 1009, the UE 1001 sends a request for a network connection to the default C-CPF 1003 via the RAN node 1002.

In 1010, the default C-CPF 1003 performs authentication and authorization for connecting to the operator's network. This includes getting the UE's subscription profile (e.g., UE usage type dedicated Core Network ID, enterprise ID, client ID, tenant-ID, customer-ID). Note that retrieving UE's subscription profile is not shown in FIG. 10. At this stage, a NAS security setup is not performed between the default C-CPF 1003 and the UE 1001.

In 1011, the default C-CPF 1003 performs a C-CPF selection.

In 1012, the default C-CPF 1003 sends a network connection response to the RAN node 1002. This includes a redirection parameter (e.g. specifying the dedicated C-CPF 1004 or a pool of dedicated C-CPFs 1004) and the authentication context of the UE 1001. The authentication context may for example include an authentication key negotiated between the default C-CPF 1003 and the UE 1001 during the authentication. Instead of having the authentication context, it may in particular include an authentication flag which allows the dedicated C-CPF 1004 (i.e. the target of the redirection) to know that it does not have to perform UE authentication once again. The network connection response may further comprises an identification of the default C-CPF 1003 or a temporary identification of the UE 1001, e.g. the UE's GUTI.

This GUTI or the ID of the default C-CPF 1003 is used to enable the rerouting target (i.e. the dedicated C-CPF 1004) to know about which C-CPF that the rerouting target should fetch the UE's authentication context, which includes for example the authentication key negotiated between the default C-CPF 1003 and the UE 1001 during the authentication performed in 1010.

In 1013, in the RAN node 1002 a NAS node selection function selects one dedicated C-CPF from the pool of dedicated C-CPFs.

In 1014, the RAN node 1002 sends the UE's request for network connection to the (selected) dedicated C-CPF 1004. This may include the redirection parameter and includes the UE's authentication context. This may further comprise an identification of the default C-CPF 1003 or a temporary identification of the UE 1001, e.g, the UE's GUTI. It should be noted that the temporary identification of the UE 1001 is only available if the default C-CPF 1003 has performed the allocation of temporary identification of the U.E.

In 1014, the dedicated C-CPF 604 performs both authentication and authorization for connecting the operator's network.

In 1015, the dedicated C-CPF 1005 performs NAS security setup with the UE 1001. The dedicated C-CPF 1005 does not perform authentication of the UE 1001 at this stage.

In 1016, the dedicated C-CPF 1004 notifies the UE 1001 that it has been accepted that the UE 1001 connects to the operator's network.

This ends the attach procedure 1017 which may be followed by session management procedures 1018, 1019 which include the exchange of PDU session requests and corresponding responses between the UE 1001 and the responsible CM control functions 1005, 1007.

Figure 11:
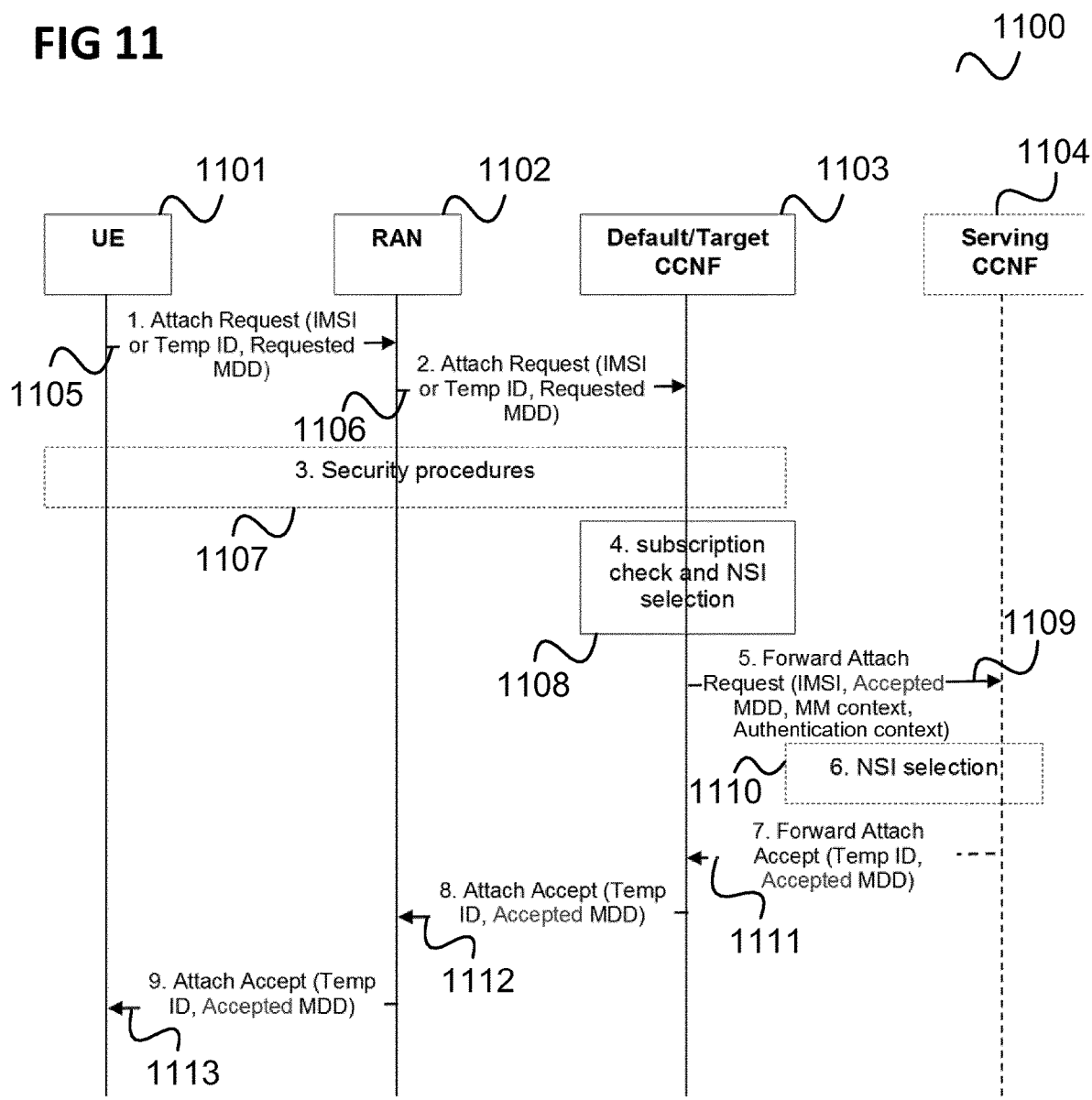
FIG. 11 shows a message flow diagram illustrating a further application of the approach of FIG. 7 in an initial access procedure.

FIG. 11 shows a message flow diagram 1100 illustrating a further application of the approach of FIG. 7 in an initial access procedure.

The message flow takes place between a UE 1101, a RAN 1102, a default common control plane function, here denoted as common control network function (CCNF) 1103 and a serving CCNF 1104.

In 1105, the UE 1101 sends an attach request to the RAN 1102. This may include an IMSI (International Mobile Subscriber Identity) or a temporal identity as well as the requested MDD (Multi-Dimensional Descriptor) for network slice instance selection.

In 1106, the RAN 1102 forwards the attach request to the default CCNF 1103.

In 1107, the default CCNF 1103 performs security procedures including authentication of the UE 1101.

In 1108, the default CCNF 1103 checks the UE's subscription and selects the corresponding network slice instance.

In 1109, the default CCNF 1103 forwards the attach request to the serving CCNF 1104. This includes the UE's IMSI, the accepted MDD and the UE's MM context as well as the transmission of the UE's authentication context of the authentication in 1107.

In 1110, the serving CCNF 1104 performs network slice instance selection.

In 1111, the serving 1104 sends an attach accept (including a temporary ID and the accepted MDD) to the default CCNF 1103 which is forwarded to the RAN 1102 in 1112 and to the UE in 1113.

Figure 12:
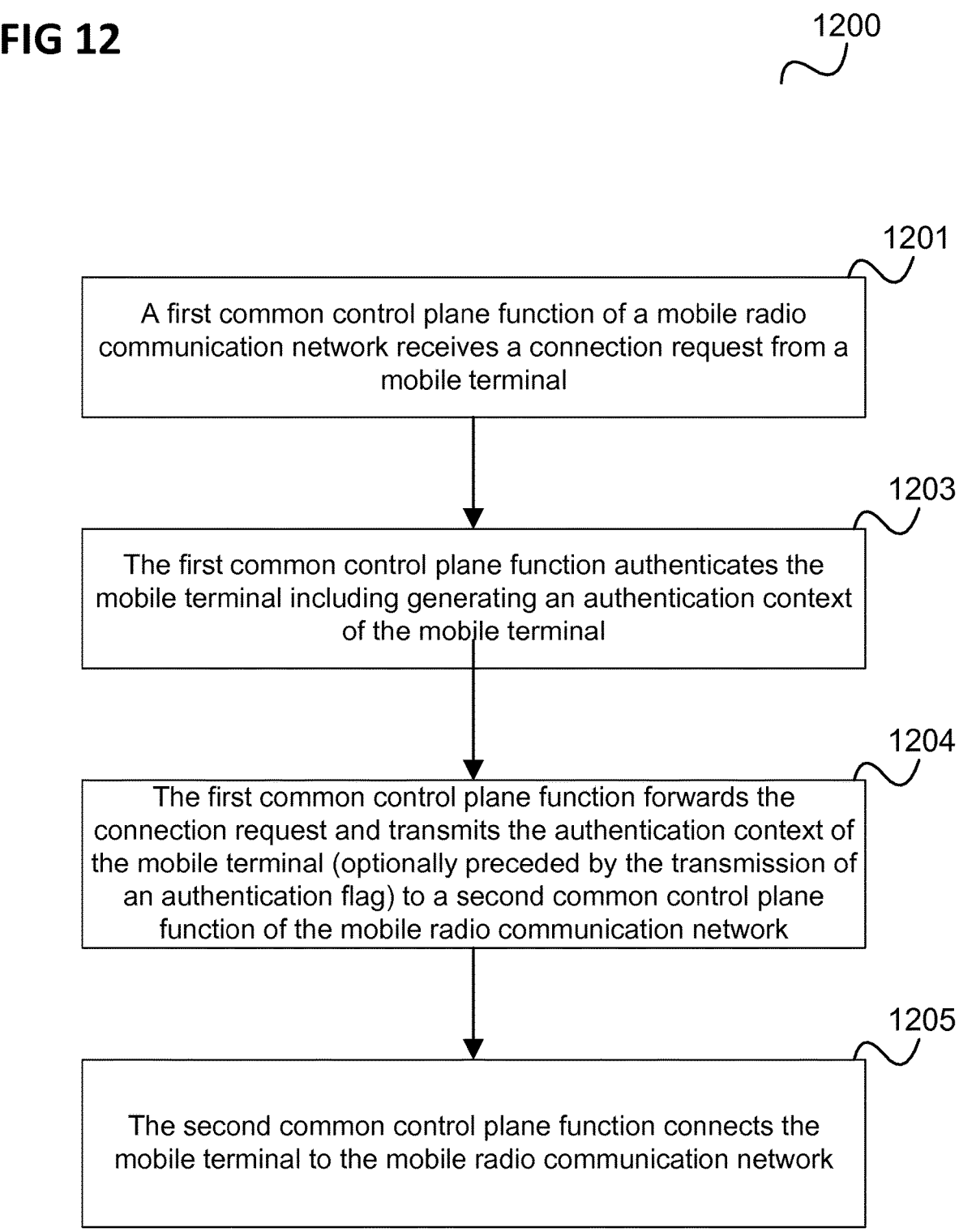
FIG. 12 shows a flow diagram illustrating a method for establishing a connection of a mobile terminal to a mobile radio communication network.

In summary, according to various embodiments, a method for establishing a connection of a mobile terminal to a mobile radio communication network is provided as illustrated in FIG. 12.

FIG. 12 shows a flow diagram 1200.

In 1201, a first common control plane function of a mobile radio communication network receives a connection request from a mobile terminal.

In 1202, the first common control plane function authenticates the mobile terminal including generating an authentication context of the mobile terminal.

In 1203, the first common control plane function forwards the connection request and transmits the authentication context of the mobile terminal or an authentication flag indicating that the authentication has already been performed by the first common control plane function to a second common control plane function of the mobile radio communication network.

In 1204, the second common control plane function connects the mobile terminal to the mobile radio communication network.

According to various embodiments, in other words, a first common control plane function performs authentication of a mobile terminal and forwards either an authentication context of the mobile terminal or an authentication flag to a second common control plane function which handles the mobile terminal's connection request (e.g. attach request). In case that the second common control plane function receives an authentication flag from the first common control plane function, the second common control plane function fetches the authentication context from the first common control plane function. The second common control plane function for example in particular handles the NAS security setup for the mobile terminal.

In other words, UE authentication and NAS security setup are performed at different common CP functions (i.e. at different network nodes, e.g. different MMEs).

The first common control plane function may indicate to the second common control plane function, e.g. by means of a parameter or the authentication context, not to perform mobile terminal authentication following the redirection, i.e. the forwarding of the connection request.

Performing the authentication at the first common control plane function allows preventing a security attack (e.g. a Denial of Service attack) from spreading and from causing unnecessary CP signaling in the network.

The authentication context may include various information like identification information of the mobile terminal, state information and mode information of the mobile terminal and an authentication key which allows the UE to authenticate (again) with the network, e.g. after a handover.

The first common control plane function and the second common control plane function may communicate directly or via the radio access network.

The first common control plane function may, according to one embodiment, only indicate an authentication flag in the reroute message (rather than the authentication context). Once the second common control plane function receives the authentication flag together with other information (e.g. GUTI), it fetches the authentication context of the mobile terminal from the first common control plane function. The reason of having included GUTI in the reroute message is to allow the second common control plane function to know which common control plane function was the one who has authenticated the UE. A possible alternative to the GUTI in this context is the GUMMEI. With only GUMMEI, the second common control plane function looks at the IMSI in the NAS Attach request that is being sent along with the reroute message.

The term "common" in common control plane function may be understood to refer to the fact that the control plane function is responsible for a plurality of core network instances (or slices), i.e. is common for a plurality of core network instances. In other words, the term "common" in common control plane function is not meant to imply conventional.

Figure 13:
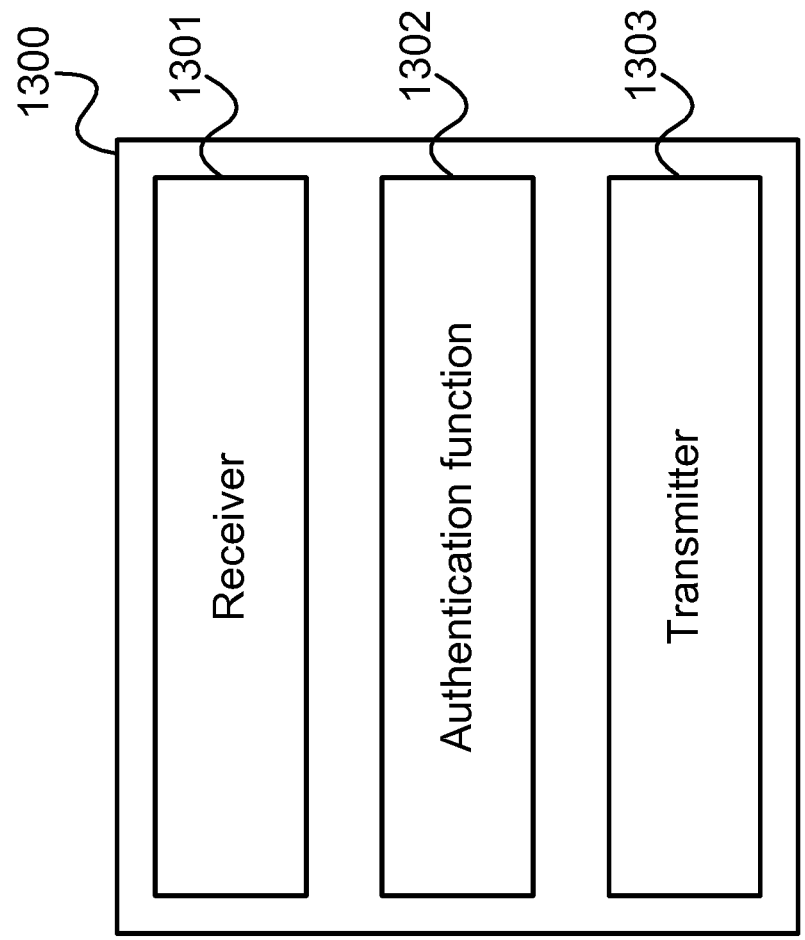
FIG. 13 shows a communication network device.

The method of FIG. 12 may for example be carried out by communication network device (e.g. a communication network component) as illustrated in FIG. 13.

FIG. 13 shows a communication network device 1300.

The communication network device 1300 is configured to implement a first common control plane function of a mobile radio communication network.

The communication network device 1300 comprises a receiver 1301 configured to receive a connection request from a mobile terminal and an authentication function 1302 configured to authenticate the mobile terminal including generating an authentication context of the mobile terminal.

Further, the communication network device 1300 comprises a transmitter 1303 configured to forward the connection request and to transmit the authentication context of the mobile terminal to a second common control plane function of the mobile radio communication network.

Various examples are described below:

Example 1 is a method for establishing a connection of a mobile terminal to a mobile radio communication network as illustrated in FIG. 12.

Example 2 is the method of Example 1, wherein the first common control plane function forwards the connection request based on a subscription profile of the mobile terminal.

Example 3 is the method of Example 1 or 2, wherein connecting the mobile terminal to the mobile radio communication network includes notifying the mobile terminal that it is allowed to connect to the mobile radio communication network.

Example 4 is the method of any one of Examples 1 to 3, wherein connecting the mobile terminal to the mobile radio communication network includes setting up secure communication with the mobile terminal.

Example 5 is the method of any one of Examples 1 to 4, further comprising the second common control plane function setting up a communication session for the mobile terminal via the mobile radio communication network.

Example 6 is the method of any one of Examples 1 to 5, wherein the connection request is an attach request.

Example 7 is the method of any one of Examples 1 to 6, wherein the authentication context includes an authentication key.

Example 8 is the method of Example 7, wherein the authentication key allows the UE to authenticate with the network after a handover.

Example 9 is the method of any one of Examples 1 to 8, wherein the authentication context indicates that the UE authentication has already been performed.

Example 10 is the method of any one of Examples 1 to 9, wherein the authentication context is transmitted with the forwarding of the connection request.

Example 11 is the method of any one of Examples 1 to 10, wherein the connection request is forwarded from the first common control plane function to the second common control plane function by means of a forwarded attach request message which includes the authentication context.

Example 12 is the method of any one of Examples 1 to 11, wherein the first common control plane function and the second common control plane function each include at least one of mobile terminal authentication functionality, a mobility management functionality, a common control plane function selection functionality and a network slice selection functionality.

Example 13 is the method of any one of Examples 1 to 12, wherein the mobile radio communication network comprises a radio access network and a core network, wherein the core network comprises the first common control plane function and the second common control plane function.

Example 14 is the method of any one of Examples 1 to 13, wherein the first common control plane function is configured to forward the connection request to the second common control plane function via the radio access network.

Example 15 is the method of any one of Examples 1 to 14, wherein the first common control plane function transmits an indication to the second common control plane function that it has authenticated the mobile terminal and the second common control plane function requests the authentication context from the first common control plane function.

Example 16 is the method of Example 15, wherein the indication is an authentication flag.

Example 17 is a communication network device as illustrated in FIG. 13.

According to a further example, a method to redirection of a UE attach request to a dedicated core network or to a dedicated network slice of an operator's network (NW) is provided, the method comprising:
  receiving a request from the UE to attach to the operator's network
  authenticating the UE by a first CP (control plane) component (e.g. CPF) before determining the dedicated core network or dedicated NW slice appropriate for the UE
  determining which core network or NW slice is appropriate for the UE by taking the UE's subscription profile into account
  rerouting the UE attach request to a second CP component (e.g. CPF) located in the dedicated core network or in the dedicated NW slice
  indicating the UE's authentication context in the rerouted UE attach request
  setting up a security context between the UE and the second CP function after receiving the rerouted UE attach request.

It should be noted that examples described in context of the method for establishing a connection of a mobile terminal to a mobile radio communication network are analogously valid for the method to redirection of a UE attach request and the communication network device and vice versa.

The components of the communication network device (e.g. the receiver, the authentication function and the transmitter) may for example be implemented by one or more circuits. A "circuit" may be understood as any kind of a logic implementing entity, which may be special purpose circuitry or a processor executing software stored in a memory, firmware, or any combination thereof. Thus a "circuit" may be a hard-wired logic circuit or a programmable logic circuit such as a programmable processor, e.g. a microprocessor. A "circuit" may also be a processor executing software, e.g. any kind of computer program. Any other kind of implementation of the respective functions which will be described in more detail below may also be understood as a "circuit".

It should further be noted that the common control plane functions do not necessarily have to be implemented by different physical devices, e.g. different server computers, but may be implemented by, e.g. the same computing device.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

The invention claimed is:

1. A method for establishing a connection of a mobile terminal to a mobile radio communication network, the method comprising:
  receiving, by a first common control plane function of the mobile radio communication network, a connection request from the mobile terminal;
  authenticating, by the first common control plane function, the mobile terminal by generating an authentication context of the mobile terminal;
  transmitting, by the first common control plane function, an authentication flag in addition to the connection request to a second common control plane function of the mobile radio communication network, the authentication flag indicating that the mobile terminal has been authenticated and that the second common control plane function does not have to authenticate the mobile terminal again;
  acquiring, by the second common control plane function, the authentication context from the first common control plane function after the second common control plane function receives the authentication flag from the first common control plane function; and
  connecting, by the second common control plane function, the mobile terminal to the mobile radio communication network, the second common control plane function connecting the mobile terminal to the mobile radio communication network without authenticating the mobile terminal again after the second common control plane function acquires the authentication context from the first common control plane function.

2. The method of claim 1, wherein the first common control plane function transmits the connection request based on a subscription profile of the mobile terminal.

3. The method of claim 2, wherein connecting the mobile terminal to the mobile radio communication network includes notifying the mobile terminal that it is allowed to connect to the mobile radio communication network.

4. The method of claim 1, wherein connecting the mobile terminal to the mobile radio communication network includes notifying the mobile terminal that it is allowed to connect to the mobile radio communication network.

5. The method of claim 1, wherein connecting the mobile terminal to the mobile radio communication network includes setting up secure communication with the mobile terminal.

6. The method of claim 1, further comprising setting up a communication session for the mobile terminal via the mobile radio communication network by the second common control plane function.

7. The method of claim 1, wherein the connection request is an attach request.

8. The method of claim 1, wherein the authentication context includes an authentication key.

9. The method of claim 8, wherein the authentication key allows the mobile terminal to authenticate with the network after a handover.

10. The method of claim 1, wherein the authentication context indicates that a mobile terminal authentication has already been performed.

11. The method of claim 1, wherein the first common control plane function and the second common control plane function each include at least one of a mobile terminal authentication functionality, a mobility management functionality, a common control plane function selection functionality and a network slice selection functionality.

* * * * *